(12) United States Patent
Kuenzi et al.

(10) Patent No.: US 11,153,709 B2
(45) Date of Patent: Oct. 19, 2021

(54) METHOD OF ADJUSTING BLUETOOTH CONNECTIVITY FOR EXPEDITING ACCESS CONTROLS

(71) Applicant: CARRIER CORPORATION, Palm Beach Gardens, FL (US)

(72) Inventors: Adam Kuenzi, Silverton, OR (US); Michael Lang, Oregon City, OR (US); Adam Purdue, Salem, OR (US); Jonah J. Harkema, Newberg, OR (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/620,148

(22) PCT Filed: Jun. 8, 2018

(86) PCT No.: PCT/US2018/036701
§ 371 (c)(1),
(2) Date: Dec. 6, 2019

(87) PCT Pub. No.: WO2018/227118
PCT Pub. Date: Dec. 13, 2018

(65) Prior Publication Data
US 2020/0145781 A1    May 7, 2020

Related U.S. Application Data

(60) Provisional application No. 62/517,388, filed on Jun. 9, 2017.

(51) Int. Cl.
*H04W 4/021*    (2018.01)
*H04W 76/15*    (2018.01)
(Continued)

(52) U.S. Cl.
CPC ............. *H04W 4/021* (2013.01); *G07C 9/10* (2020.01); *H04W 4/80* (2018.02); *H04W 12/06* (2013.01); *H04W 12/63* (2021.01); *H04W 76/15* (2018.02)

(58) Field of Classification Search
CPC ............ G07C 9/28; G07C 2009/00793; G07C 2209/64
(Continued)

(56) References Cited

U.S. PATENT DOCUMENTS 6,617,960 B1    9/2003    Fischer et al.
7,567,920 B2    7/2009    Hammad et al.
(Continued)

FOREIGN PATENT DOCUMENTS

CN    204331869 U    5/2015
CN    105405170 A    3/2016
(Continued)

OTHER PUBLICATIONS

Notification of Transmittal of the International Search Report and the Written Opinion of the International Searching Authority, or the Declaration for International Application No. PCT/US2018/036701; Report dated Aug. 27, 2018; 10 pages.
(Continued)

*Primary Examiner* — Fabricio R Murillo Garcia
(74) *Attorney, Agent, or Firm* — Cantor Colburn LLP (57) ABSTRACT

A method of controlling access through a Bluetooth connection is provided. The method comprising: detecting Bluetooth advertisements of one or more access controllers using a mobile device application; determining whether to connect to the Bluetooth advertisements using the mobile device application; connecting the mobile device application to each of the one or more access controllers using separate Bluetooth connections; enumerating services of each access
(Continued)

controller using the mobile device application; authenticating the mobile device application by transferring a credential; detecting intent of the mobile device application to engage a specific access controller; and activating a lock actuator within the specific access controller.

18 Claims, 5 Drawing Sheets

(51) Int. Cl.
  *H04W 4/80* (2018.01)
  *G07C 9/10* (2020.01)
  *H04W 12/06* (2021.01)
  *H04W 12/63* (2021.01)
(58) Field of Classification Search
  USPC ........................................................ 340/5.61
  See application file for complete search history.

(56) References Cited

U.S. PATENT DOCUMENTS

| | | | |
|---|---|---|---|
| 8,174,356 | B2 | 5/2012 | Ponert et al. |
| 8,290,552 | B2 | 10/2012 | White |
| 8,313,028 | B2 | 11/2012 | Itay et al. |
| 8,907,768 | B2 | 12/2014 | Faith et al. |
| 8,929,861 | B2 | 1/2015 | Carbonell Duque et al. |
| 9,361,741 | B2 | 6/2016 | Robertson et al. |
| 9,483,887 | B1 | 11/2016 | Soleimani |
| 9,485,607 | B2 | 11/2016 | Aarnio |
| 9,514,589 | B2 | 12/2016 | Raina et al. |
| 9,557,719 | B2 | 1/2017 | Liu et al. |
| 9,558,377 | B2 | 1/2017 | Wendling et al. |
| 9,589,403 | B2 | 3/2017 | Lingan et al. |
| 2002/0136214 | A1* | 9/2002 | Do ..................... G06Q 20/4014 |
| | | | 370/392 |
| 2008/0156873 | A1 | 7/2008 | Wilhelm et al. |
| 2011/0246369 | A1 | 10/2011 | De Oliveira et al. |
| 2012/0188054 | A1* | 7/2012 | Bongard ............ G07C 9/00309 |
| | | | 340/5.61 |
| 2014/0279558 | A1* | 9/2014 | Kadi .................... G06Q 20/322 |
| | | | 705/71 |
| 2015/0084736 | A1* | 3/2015 | Horton ................. H04B 5/0056 |
| | | | 340/5.7 |
| 2015/0084741 | A1 | 3/2015 | Bergdale et al. |
| 2015/0142483 | A1 | 5/2015 | Bergdale et al. |
| 2015/0227923 | A1 | 8/2015 | Kutsch et al. |
| 2016/0042575 | A1 | 2/2016 | Ganguly et al. |
| 2016/0093127 | A1 | 3/2016 | Evans |
| 2016/0198499 | A1* | 7/2016 | Lee ....................... H04W 4/026 |
| | | | 455/450 |
| 2016/0269577 | A1 | 9/2016 | Sato |
| 2016/0269591 | A1* | 9/2016 | Morishita ............. G06F 3/1236 |
| 2016/0343181 | A1 | 11/2016 | Cheng et al. |
| 2017/0084102 | A1 | 3/2017 | Szyme et al. |
| 2018/0144569 | A1* | 5/2018 | Einberg ................ H04W 4/027 |

FOREIGN PATENT DOCUMENTS

| | | |
|---|---|---|
| CN | 205140012 U | 4/2016 |
| EP | 2991041 A2 | 3/2016 |
| EP | 3070900 A1 | 9/2016 |
| WO | 2016089837 A1 | 6/2016 |
| WO | 2017017525 A1 | 2/2017 |

OTHER PUBLICATIONS

First Chinese Office Action for Application No. 201880051626.1; Office Action dated Jan. 5, 2021; 8 pages.

* cited by examiner

METHOD OF ADJUSTING BLUETOOTH CONNECTIVITY FOR EXPEDITING ACCESS CONTROLS

CROSS-REFERENCE TO RELATED APPLICATIONS

This application is based on International Application No. PCT/US2018/036701 filed Jun. 8, 2018, which claims priority to U.S. Provisional Patent Application Ser. No. 62/517,388 filed Jun. 9, 2017, both of which are incorporated herein by reference in their entirety.

BACKGROUND

The subject matter disclosed herein generally relates to the field of access control systems, and more particularly to an apparatus and method for establishing access controls through Bluetooth connections.

Existing access controls may allow a person to activate an access controller to unlock a lock through a Bluetooth capable mobile device. However Bluetooth connectivity is often cumbersome and slow, thus a more efficient solution is desired.

BRIEF SUMMARY

According to one embodiment, a method of controlling access through a Bluetooth connection is provided. The method comprising: detecting Bluetooth advertisements of one or more access controllers using a mobile device application; determining whether to connect to the Bluetooth advertisements using the mobile device application; connecting the mobile device application to each of the one or more access controllers using separate Bluetooth connections; enumerating services of each access controller using the mobile device application; authenticating the mobile device application by transferring a credential; detecting intent of the mobile device application to engage a specific access controller; and activating a lock actuator within the specific access controller.

In addition to one or more of the features described above, or as an alternative, further embodiments may include: disconnecting the mobile device application from each access controller where intent was not detected.

In addition to one or more of the features described above, or as an alternative, further embodiments may include: maintaining the Bluetooth connection between the mobile device application and each of the access controllers for a selected period of time after authenticating the mobile device application and before detecting intent.

In addition to one or more of the features described above, or as an alternative, further embodiments may include where intent is detected when the mobile device application is within a selected range of the specific access controller.

In addition to one or more of the features described above, or as an alternative, further embodiments may include where the one or more access controllers are each operably connected to a turnstile.

In addition to one or more of the features described above, or as an alternative, further embodiments may include where the one or more access controllers are each operably connected to a door.

In addition to one or more of the features described above, or as an alternative, further embodiments may include where the mobile device application connects to a Bluetooth bridge, wherein the Bluetooth bridge performs the operations of: authenticating the mobile device application by transferring a credential; and detecting intent of the mobile device application to engage a specific access controller.

In addition to one or more of the features described above, or as an alternative, further embodiments may include where the intent of the mobile device application to engage a specific access controller is detected after the mobile device application is authenticated.

In addition to one or more of the features described above, or as an alternative, further embodiments may include where the intent of the mobile device application to engage a specific access controller is detected before the mobile device application is authenticated.

According to another embodiment, an access control system is provided. The access control system comprising: one or more access controllers, wherein each of the one or more access controllers transmits a Bluetooth advertisement; a mobile device application configured to detect the Bluetooth advertisements from each access controller, determine whether to connect to the Bluetooth advertisements, and connect to each access controller through separate Bluetooth connections; wherein the mobile device application is configured to enumerate services of each access controller after connecting to each access controller; wherein each access controller authenticates the mobile device application; wherein a lock actuator is configured to actuate when an intent of the mobile device application to engage a specific access controller containing the lock actuator is detected.

In addition to one or more of the features described above, or as an alternative, further embodiments may include where the mobile device application disconnects from each access controller where intent is not detected after intent is detected to engage the specific access controller.

In addition to one or more of the features described above, or as an alternative, further embodiments may include where the mobile device application maintains the Bluetooth connection between the mobile device application and each of the access controllers for a selected period of time after the mobile device application is authenticated and before intent is detected.

In addition to one or more of the features described above, or as an alternative, further embodiments may include where intent is detected when the mobile device application is within a selected range of the specific access controller.

In addition to one or more of the features described above, or as an alternative, further embodiments may include where the one or more access controllers are each operably connected to a turnstile.

In addition to one or more of the features described above, or as an alternative, further embodiments may include where the one or more access controllers are each operably connected to a door.

In addition to one or more of the features described above, or as an alternative, further embodiments may include where the mobile device application connects to each of the one or more access controllers through a Bluetooth bridge, the Bluetooth bridge being configured to authenticate the mobile device application for the access controllers and detect the intent of the mobile device application to engage a specific access controller.

In addition to one or more of the features described above, or as an alternative, further embodiments may include where the intent of the mobile device application to engage a specific access controller is detected after the mobile device application is authenticated.

In addition to one or more of the features described above, or as an alternative, further embodiments may include where the intent of the mobile device application to engage a specific access controller is detected before the mobile device application is authenticated.

According to another embodiment, a method of controlling access through a Bluetooth connection is provided. The method comprising: detecting Bluetooth advertisements of one or more access mobile device applications using an access controller; determining whether to connect to the Bluetooth advertisements using the access controller; connecting the access controller to each of the one or more mobile device applications using separate Bluetooth connections; enumerating services of each mobile device application using the access controller; authenticating each mobile device application by transferring a credential; detecting intent of a specific mobile device application to engage the access controller; and activating a lock actuator within the access controller.

In addition to one or more of the features described above, or as an alternative, further embodiments may include: disconnecting the access controller from each mobile device application where intent was not detected.

In addition to one or more of the features described above, or as an alternative, further embodiments may include: maintaining the Bluetooth connection between the access controller and each of the mobile device application for a selected period of time after authenticating the mobile device application and before detecting intent.

In addition to one or more of the features described above, or as an alternative, further embodiments may include where intent is detected when the specific mobile device application is within a selected range of the access controller.

In addition to one or more of the features described above, or as an alternative, further embodiments may include where the access controller is operably connected to a turnstile.

In addition to one or more of the features described above, or as an alternative, further embodiments may include where the access controller is operably connected to a door.

In addition to one or more of the features described above, or as an alternative, further embodiments may include where the Bluetooth bridge connects to one or more mobile device applications, wherein the Bluetooth bridge performs the operations of: authenticating each mobile device application by transferring a credential; and detecting intent of a specific mobile device application to engage the access controller.

In addition to one or more of the features described above, or as an alternative, further embodiments may include where the intent of a specific mobile device application to engage the access controller is detected after the one or more mobile device applications are authenticated.

In addition to one or more of the features described above, or as an alternative, further embodiments may include where the intent of a specific mobile device application to engage the access controller is detected before the one or more mobile device applications are authenticated.

According to another embodiment, a computer program product tangibly embodied on a computer readable medium is provided. The computer program product including instructions that, when executed by a processor, cause the processor to perform operations comprising: detecting Bluetooth advertisements of one or more access controllers using a mobile device application; connecting the mobile device application to each of the one or more access controllers using separate Bluetooth connections; enumerating services of each access controller using the mobile device application; authenticating the mobile device application; detecting intent of the mobile device application to engage a specific access controller; and activating a lock actuator within the specific access controller.

In addition to one or more of the features described above, or as an alternative, further embodiments may include: disconnecting the mobile device application from each access controller where intent was not detected.

Technical effects of embodiments of the present disclosure include pre-connecting a mobile device application to one or more access controllers through Bluetooth before intent of a user of the mobile device application is known, in order to expedite the actuation process of an access controller.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
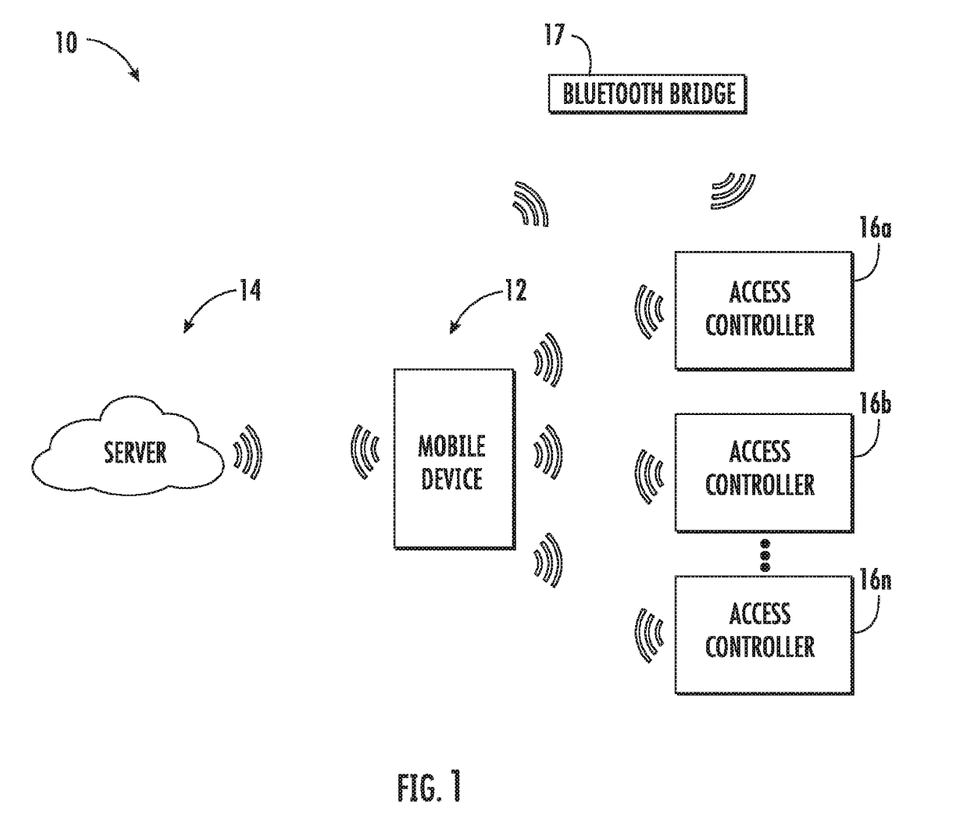
FIG. 1 illustrates a general schematic system diagram of a user authentication system, in accordance with an embodiment of the disclosure.

FIG. 1 schematically illustrates an access control system 10. The system 10 generally includes a mobile device 12, a server 14, and a plurality of access controls 16, schematically illustrated as 16a, 16b, . . . , 16n. It should be appreciated that, although particular systems are separately defined in the schematic block diagrams, each or any of the systems may be otherwise combined or separated via hardware and/or software. In an embodiment, the access controls 16 may control access through a turnstile. In another embodiment, the access controls 16 may control access through a door.

The mobile device 12 is a wireless capable handheld device such as a smartphone that is operable to communicate with the server 14 and the access controls 16. The server 14 may provide credentials and other data to the mobile device 12, such as firmware or software updates to be communicated to one or more of the access controls 16. Although the server 14 is depicted herein as a single device, it should be appreciated that the server 14 may alternatively be embodied as a multiplicity of systems, from which the mobile device 12 receives credentials and other data.

Each access controller 16 is a wireless-capable, restricted-access, or restricted-use device such as wireless locks, access control readers for building entry, electronic banking controls, data transfer devices, key dispenser devices, tool dispensing devices, and other restricted-use machines. The mobile device 12 submits credentials to the access controllers 16, thereby selectively permitting a user to access or activate functions of the access controllers 16. A user may, for example, submit a credential to an electromechanical lock to unlock it, and thereby gain access to a restricted area. In another example, a user may submit a credential to an electronic banking control to withdraw funds. In an alternative embodiment, the mobile device 12 may submit credentials to the access controllers through a Bluetooth bridge 17. Advantageously, utilizing a Bluetooth bridge 17 for direct communication with the mobile device 12 allows for a single high-speed, high-power device to be used solely for Bluetooth communication rather than a utilizing separate high-speed, high power communication devices for each access controller 16.

A mobile device 12 may store credentials for one or all or other of the examples noted above, and in addition may store a plurality of credentials for each type of application at the same time. Some credentials may be used for multiple access controllers 16. For example, a plurality of electronic locks in a facility may respond to the same credential. Other credentials may be specific to a single access controller 16.

Figure 2:
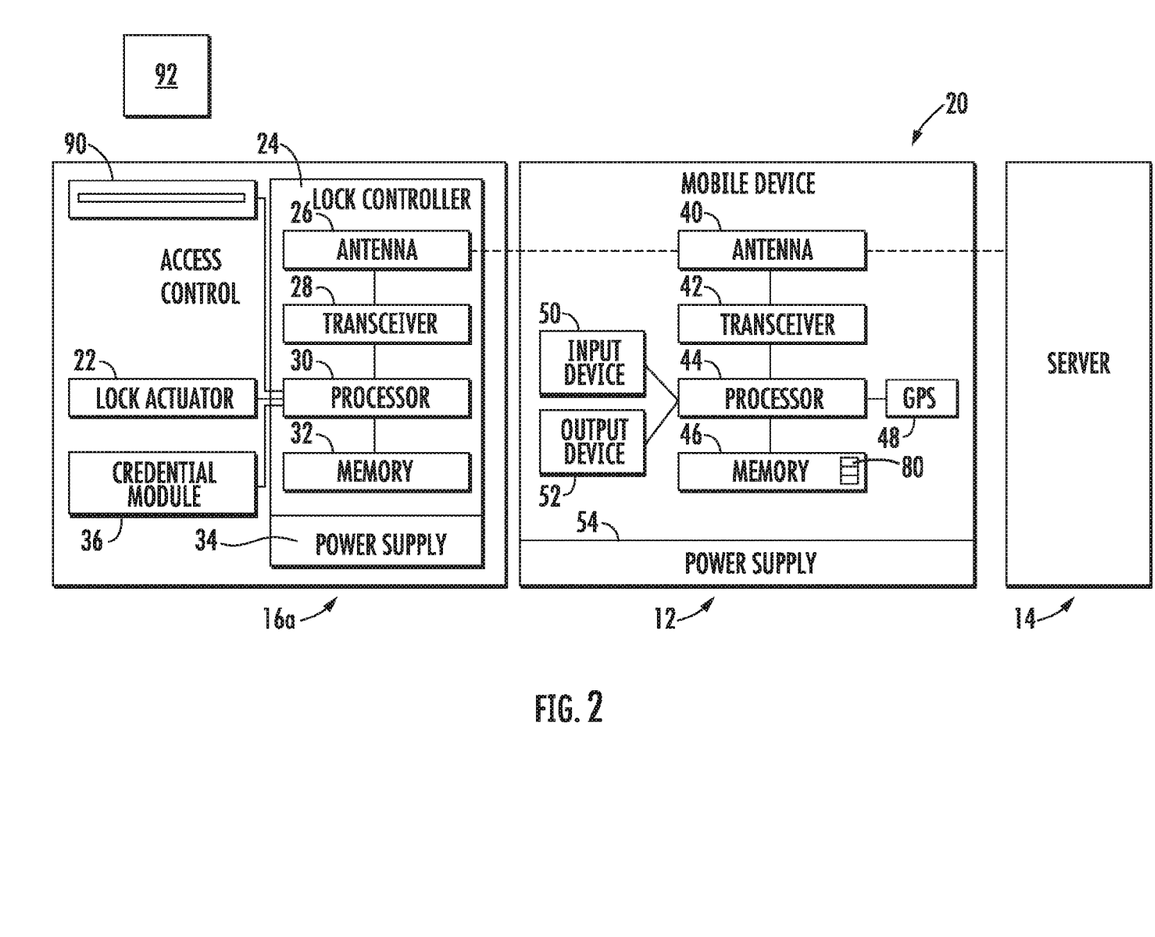
FIG. 2 illustrates a block diagram of the user authentication system, in accordance with an embodiment of the disclosure.

With reference to FIG. 2, a block diagram of an example electronic lock system 20 includes the access controller 16a, the mobile device 12, and the server 14. The access controller 16a generally includes a lock actuator 22, a lock controller 24, a lock antenna 26, a lock transceiver 28, a lock processor 30, a lock memory 32, a lock power supply 34, a lock card reader 90 and a credential module 36. The access controller 16a may have essentially two readers, one reader 90 to read a physical key card 92 and the credential module 36 to communicate with the mobile device 12 via the lock processor 30 and the transceiver 28 and antenna 26. The access controller 16a is responsive to credentials from the mobile device 12, and may, for example, be the lock of a turnstile or a door lock. Although the present disclosure focuses primarily on credentials for access controller, it should be appreciated that other systems wherein credentials are transmitted from a mobile device to an access controller so as to identify the user to an online system or validate user access rights or permissions in an offline system will benefit herefrom. Such systems include virtual or electronic banking systems, machine operation systems, dispensing systems, and data access systems.

Upon receiving and authenticating an appropriate credential from the mobile device 12 using the credential module 36, or after receiving card data from lock card reader 90, the lock controller 24 commands the lock actuator 22 to lock or unlock a mechanical or electronic lock. The lock controller 24 and the lock actuator 22 may be parts of a single electronic or electromechanical lock unit, or may be components sold or installed separately.

The lock transceiver 28 is capable of transmitting and receiving data to and from at least the mobile device 12. The lock transceiver 28 may, for instance, be a near field communication (NFC), Bluetooth, or Wi-Fi transceiver, or another appropriate wireless transceiver. The lock antenna 26 is any antenna appropriate to the lock transceiver 28. The lock processor 30 and lock memory 32 are, respectively, data processing, and storage devices. The lock processor 30 may, for instance, be a microprocessor that can process instructions to validate credentials and determine the access rights contained in the credentials or to pass messages from a transceiver to a credential module 36 and to receive a response indication back from the credential module 36. The lock memory 32 may be RAM, EEPROM, or other storage medium where the lock processor 30 can read and write data including but not limited to lock configuration options and the lock audit trail. The lock audit trail may be a unified audit trail that includes events initiated by accessing the lock via the mobile device 12. The lock power supply 34 is a power source such as line power connection, a power scavenging system, or a battery that powers the lock controller 24. In other embodiments, the lock power supply 34 may only power the lock controller 24, with the lock actuator 22 powered primarily or entirely by another source, such as user work (e.g. turning a bolt).

While the figure shows the lock antenna 26 and the transceiver 28 connected to the processor 30, this is not to limit other embodiments that may have additional antenna 26 and transceiver 28 connected to the credential module 36 directly. The credential module 36 may contain a transceiver 28 and antenna 26 as part of the credential module. Or the credential module 36 may have a transceiver 28 and antenna 26 separately from the processor 30 which also has a separate transceiver 28 and antenna 26 of the same type or different. In some embodiments, the processor 30 may route communication received via transceiver 28 to the credential module 36. In other embodiments the credential module may communicate directly to the mobile device 12 through the transceiver 28.

The mobile device 12 generally includes a key antenna 40, a key transceiver 42, a key processor 44, a key memory 46, a GPS receiver 48, an input device 50, an output device 52, and a key power supply 54. The key transceiver 42 is a transceiver of a type corresponding to the lock transceiver 28, and the key antenna 40 is a corresponding antenna. In some embodiments, the key transceiver 42 and the key antenna 40 may also be used to communicate with the server 14. In other embodiments, one or more separate transceivers and antennas may be included to communicate with server 14. The key memory 46 is of a type to store a plurality of credentials locally on the mobile device 12. The mobile device 12 may also include a mobile device application 80. Embodiments disclosed herein, may operate through the mobile device application 80 installed on the mobile device 12.

Figure 3:
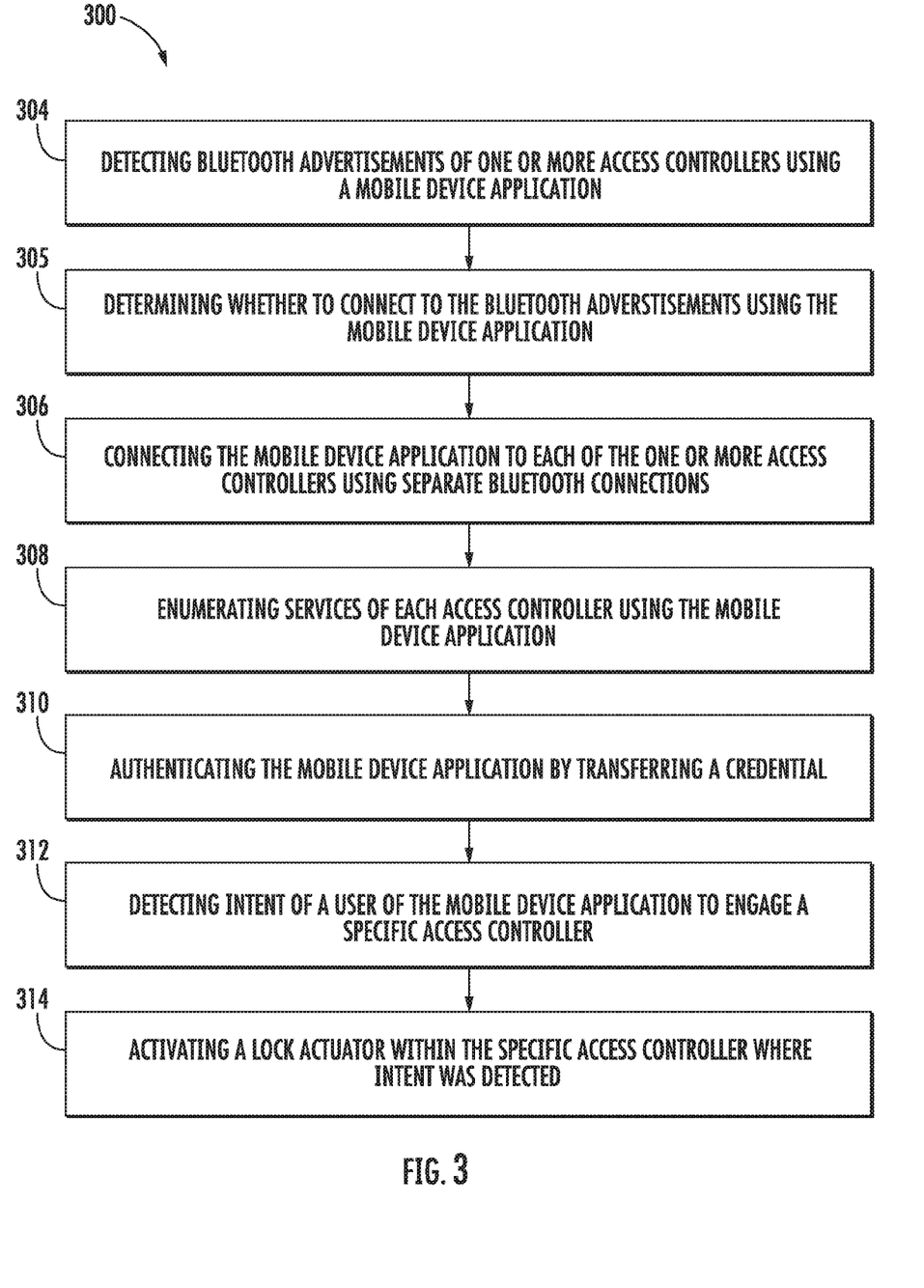
FIG. 3 is a flow diagram illustrating a method of controlling through a Bluetooth connection, according to an embodiment of the present disclosure.
Figure 4:
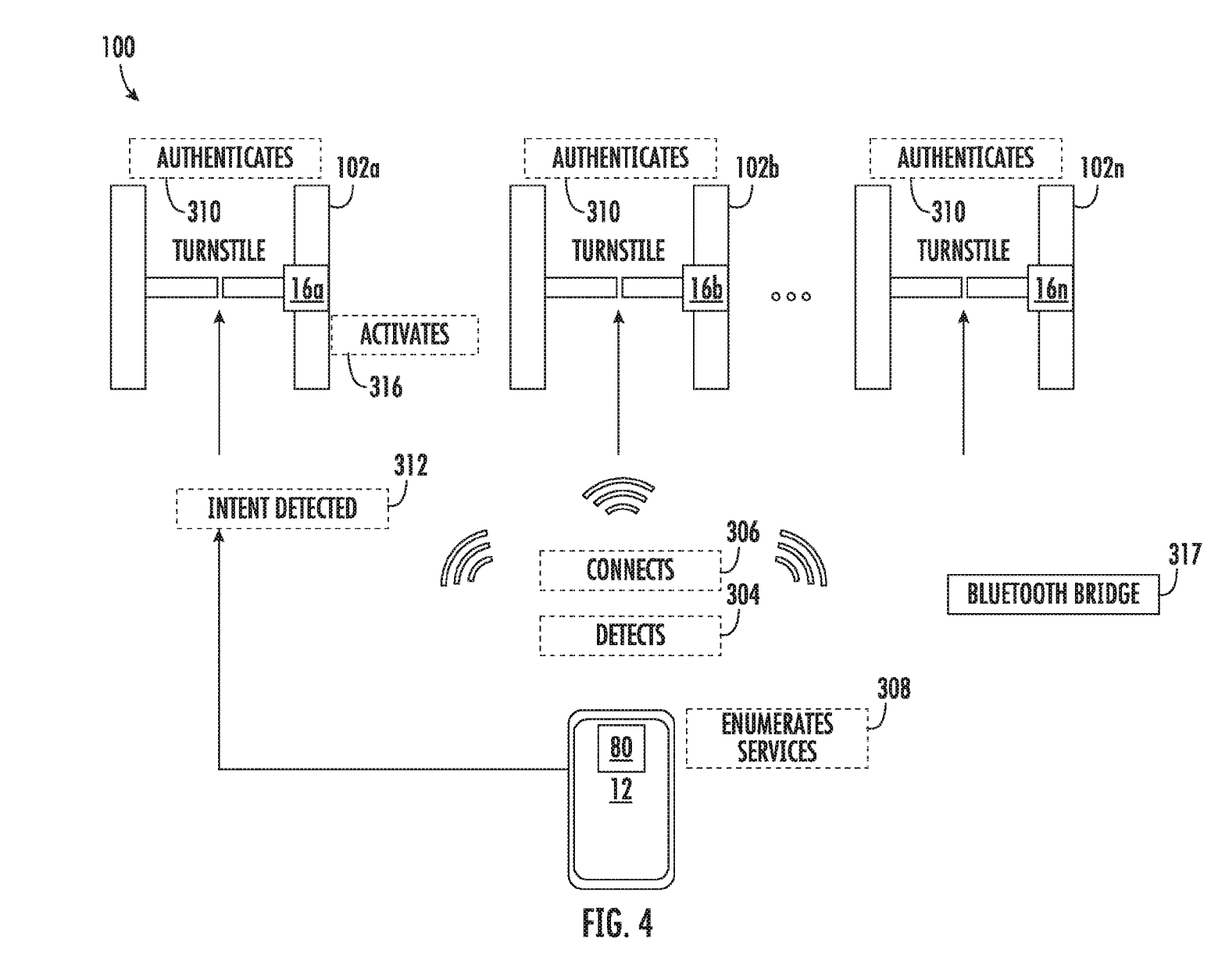
FIG. 4 is a schematic of the method of FIG. 3 applied to a turnstile system, according to an embodiment of the present disclosure.
Figure 5:
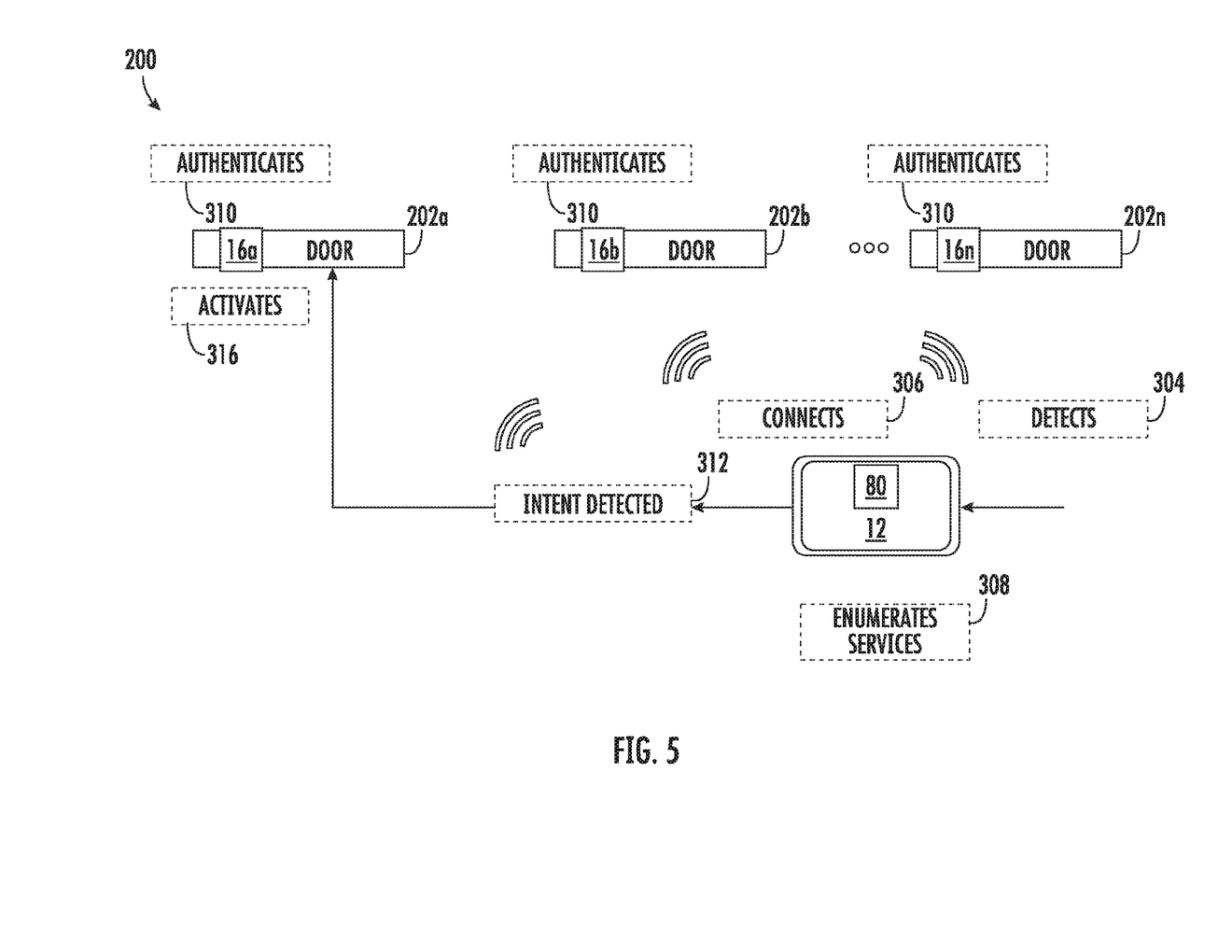
FIG. 5 is a schematic of the method of FIG. 3 applied to a door system, according to an embodiment of the present disclosure.

Referring now to FIG. 3-5, while referencing components of FIGS. 1-3. FIG. 3 shows a flow chart of method 300 of controlling access through a Bluetooth connection, in accordance with an embodiment of the disclosure. Steps of the method 300 may be performed by the mobile device application 80 on the mobile device 12. Advantageously, significant time is saved if some of the Bluetooth connection communication occurs before a user signals intent and then the connection communication is completed after they signal intent, as illustrated by method 300. It is to be understood that the intent of a user of the mobile device 12 is transferred to the mobile device application 80 when the intent of the user is detected and thus the intent of the user becomes the intent of the mobile device application 80. FIG. 4 incorporates the method 300 into a turnstile system 100 and FIG. 5 incorporates the method 300 into a door system 200. The turnstile system 100 generally includes one or more turnstiles 102, schematically illustrated as 102a, 102b, . . . , 102n. In an example, the turnstile may located in the lobby of the building to gain access to the building. The door system 200 generally includes one or more doors 202, schematically illustrated as 202a, 202b, . . . , 202n. In an example, the doors may be doors to hotel rooms. At block 304, Bluetooth advertisements of one or more access controllers 16 are detected using a mobile device application 80. The access controllers 16 are continually transmitting their advertisements for other devices to detect and connect. At block, 305 the mobile device application 80 may determine whether to connect to the Bluetooth advertisements.

At block 306, the mobile device application 80 is connected using the Bluetooth communication capabilities of the mobile device 12 to each of the one or more access controllers 16 using separate Bluetooth connections. At block 308, the mobile device application 80 enumerates services of each access controller 16. Enumerating the services of each access controller 16 allows the mobile device application 80 to discover what operations of the access controller 16 the mobile device application 80 can control. The enumeration of services is part of the Bluetooth specification. It may be required at the start of a connection process so that the mobile device application 80 is aware of what service and characteristics of each service to use for communication. There may be different defined services and characteristics. In one example a standard service may be getting temperature from a thermostat, where the service would be a thermostat service and the characteristic would be temperature. In the embodiments illustrated in FIGS. 4 and 5, the service enumerated is a credential transfer service and the characteristics are for reading/writing data into the credential validator. This is used for transferring credential data to the access controller 16 for validation to open a lock For example, the mobile device application 80 may be able to unlock a turnstile 102 in FIG. 4 once method 300 is complete. In another example, the mobile device application 80 may be able to unlock a door 202 in FIG. 5 once method 300 is complete. At block 310, the mobile device application 80 is authenticated by transferring a credential. Authentication is where the mobile device application 80 uses the services and characteristics to send credential data over a Bluetooth connection to the credential module 36 for validation. This then confirms that the mobile device application 80 has the proper credentials . . . etc. One of skill in the art may appreciate that there may be variations in how the authentication is done. In the example of a hotel door lock, the credential contains "card data" as a payload of the credential. Once the credential is transferred to the access control 16 it is validated by the credential module 36. Once validated, the card data is sent into the lock controller 24 and is validated as a virtual card read. Thus, this authentication is all done locally or offline with the access controller 16a (i.e. lock) making the determination. In the example of a turnstile 102, the credential may include a 'badge id' that is part of the payload of the credential. On authentication this credential is validated at the turnstile 102, but the badge id may be sent into an access control system 10 much like a traditional badge read at a turnstile 102. In an online configuration, the access control system 10 may have an access panel or other remote means that makes the decision that this badge id is allowed into this turnstile 102 (or door 202). In the online configuration, the determination to actuate the turnstile 102 would be made by the centralized access controller and/or by the access controller 16a itself.

In one non-limiting example, the mobile device application 80 will be able to unlock a turnstile 102 in FIG. 4 once method 300 is complete only if the credential of the mobile device application 80 has been authorized. In another example, the mobile device application 80 will be able to unlock a door 202 in FIG. 5 once method 300 is complete only if the credential of the mobile device application 80 has been authorized. In a further example of FIG. 5, a credential of a mobile device application 80 may not be authorized to unlock doors 202 of rooms that they are not assigned to as a guest. Advantageously, a great deal of time is saved by establishing a connection in block 306, enumerating services in block 308, and authenticating the mobile device in block 310 before any intent of a user of the mobile device application 80 is known regarding which access controller 16 the mobile device application 80 intends to interact with. In the example of FIG. 4, the steps of connecting, enumerating, and authenticating in the Bluetooth connection process are all being performed as a person carrying the mobile device 12 with the mobile device application 80 is approaching the turnstile 102 they intent to walk through. In the example of FIG. 5, the steps of connecting, enumerating, and authenticating in the Bluetooth connection process are all being performed as a person carrying the mobile device 12 with the mobile device application 80 is walking down a hallway towards the door 202 they intend to enter.

At block 312, intent of a user of the mobile device application 80 to engage a specific access controller 16a is detected. In an embodiment, the intent of the user of the mobile device application 80 to engage a specific access controller 16a is detected after the mobile device application 80 is authenticated. In another embodiment, the intent of the user of the mobile device application 80 to engage a specific access controller 16a is detected before the mobile device application 80 is authenticated. Intent may be shown by various methods. In one embodiment, intent may be shown by moving towards the specific access controller 16 (i.e. turnstile 102a or door 202a) they desire to enter, which may be determined by the distances between the mobile devices 12 and the access controllers 16. Distance can be inferred by the received signal strength. For example, if the signal strength goes up, then the mobile device 12 containing the mobile device application 80 might be moving closer. In an embodiment, the received signal strength indicator RSSI must cross a threshold to signal intent. In another embodiment, intent may be shown by taping the mobile device 12 containing the mobile device application 80 on the specific access controller 16a or another reader operably connected to the specific access controller 16a. The tapping may be detected by an accelerometer in the mobile device 12 and also coupled with a very high RSSI that shows which access controller 16 they are tapping on. In another embodiment, intent may also be inferred based upon past behavior, such as, for example, a mobile device 12 containing the mobile device application 80 always enters the building through a specific turnstile 102a. In yet another embodiment, intent may be shown by a user making a selection on a screen of the mobile device 12 through the mobile device application 80. For example, the a list of names of one or more access controllers 16 may display on the screen and the user may select one of the access controllers to indicate that they want to access the turnstile 102 or door 202 linked to the access controller 12.

At block 314, a lock actuator 22 within the specific access controller 16a is activated, thus once intent is known the mobile device application 80 is granted access to activate the specific access controller 16a. In the example of FIG. 4, at block 314 the specific access controllers 16a will unlock turnstile 102a. In the example of FIG. 5, at block 314 the specific access controllers 16a will unlock door 202a. In an embodiment, the lock actuator 22 may only be activated when the mobile device 12 containing the mobile device application 80 is a selected distance away from the specific access controller 16a. Distance can be determined by many different methods including but not limited to detecting the level of received signal strength through RSSI to determine distance; an indoor locating system that may or may not utilize Bluetooth (ex: WiFi); a GPS system; and by any other means known to one of skill in the art of determining distance from a mobile device to another device. Advantageously, this distance requirement may help prevent one person at the back of a line from unlocking the turnstile 102 for another person at the front of the line.

The method 300 may also include disconnecting the mobile device application 80 from each access controller 16 where intent was not detected. For example, once it is determined where the mobile device 12 containing the mobile device application 80 is heading there is no reason to maintain the Bluetooth connections to other access controllers 16 that will not be used, thus freeing up Bluetooth capacity for other mobile devices. The method 300 may further include between blocks 310 and 312: maintaining the Bluetooth connection between the mobile device application 80 and each of the access controllers 16 for a selected period of time after authenticating the mobile device application 80 and before detecting intent. Advantageously, holding the Bluetooth connection open for a selected period of time before intent is determined allows connecting, enumerating, and authenticating well in advance of knowing the intent of the user of the mobile device application 80, thus speeding up the overall process and reducing the number of remaining steps in method 300 once intent is determined.

In an alternate embodiment, block 312 may proceed block 310. In this alternate embodiment the steps of detection at block 304, connection at block 306, and enumeration at block 308 would occur and then the access control system 10 would wait for intent at block 312 before doing the full authentication at block 310. This alternate embodiment may be advantageous if the access control 16 can only handle so many authenticated connections, thus then it could be easier to handle a basic connection and wait to authenticate until intent is determined.

In a second alternative embodiment, the access controllers 16 may be wired and/or wirelessly connected to a Bluetooth bridge 17, which continuously projects out an advertisement for the Bluetooth bridge 17. The advertisement for the Bluetooth bridge 17 represents the whole turnstile system 100 with all of turnstiles 102 in each lane. With the addition of a Bluetooth bridge 17, method 300 may include sending to the Bluetooth bridge 17 which turnstile 102 the mobile device 12 containing the mobile device application 80 is at when intent is determined. The intent would include which turnstile lane you are in (i.e. 102a, 102b, etc.). This determination could be made at block 312 of method 300. Determination of the lane could be done by any indoor locating means, including but not limited to: use of Bluetooth signals from each access control 16a-16n or other iBeacon type devices, or Wi-Fi positioning, or other well-known methods in the art of indoor positioning. The determination of the lane could also be by the user selecting a lane identifier on a screen of the mobile device 12 through the mobile device application 80, or by using a camera in the mobile device 12 to detect a lane identifier, etc. Knowing which lane you are in is important for the Bluetooth bridge 17 because the Bluetooth bridge 17 does not know which turnstile 102 (or door 202) you want to go through. After the message from the mobile device application 80 to the Bluetooth bridge 17 is sent, the Bluetooth bridge 17 would then signal to the particular turnstile (or door 202) to open. Utilizing a Bluetooth bridge 17 is advantageous because the Bluetooth bridge 17 can be a much higher powered device that can handle many more connections than an embedded constrained system. Additionally, the Bluetooth Bridge 17 creates a single point of connection rather than a multi-connect scenario.

In the embodiment of method 300, the mobile device application 80 is a Bluetooth central and the access controls 16 are a Bluetooth peripheral. In a third alternative embodiment, the access controls 16 are the Bluetooth central and the mobile device application 80 is the Bluetooth peripheral. In this third alternative embodiment, block 304 is completed in reverse and the mobile device application 80 is advertising and the access controllers 16 are detecting. In this third alternative embodiment, block 306 is executed by access controllers 16 connecting automatically to the phone. In this third alternative embodiment, at block 308 the access controllers 16 enumerate services of the mobile device 308 and then read the credential from the mobile device 16 to authenticate the mobile device application 80 at block 310. In this third alternative embodiment, at block 312 the mobile device application 80 and/or the access controllers 12 may detect intent based upon distance/proximity/location or other means. In this third alternative embodiment, at block 314 the access controller will activate the lock actuator 22.

While the above description has described the flow process of FIG. 3-5 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of controlling access through a Bluetooth connection, the method comprising:
   detecting, by a mobile application on a mobile device in an access control system, Bluetooth advertisements of one or more access controllers in the access control system
   determining, by the mobile device application whether to connect to the Bluetooth advertisements;
   connecting, by the mobile device application, to each of the one or more access controllers using separate Bluetooth connections;
   enumerating, by the mobile device application, services of each of the one or more access controllers;
   authenticating, by each of the one or more access controllers, the mobile device application by validating a credential transferred from the mobile device application over a respective one of the separate Bluetooth connections;
   detecting, by the one or more access controllers, intent of the mobile device application to engage a specific access controller of the one or more access controllers by determining where the mobile device comprising the mobile device application is heading, wherein the intent of the mobile device application to engage the specific access controller is detected after the mobile device application is authenticated; and
   activating, by the specific access controller, a lock actuator within the specific access controller to unlock a lock of the specific access controller,
   wherein the connecting, enumerating, and authenticating are performed as the mobile device is moving towards the specific access controller and prior to the intent being detected, and
   wherein the intent is shown by the mobile device moving towards the specific access controller or based on past behavior of how the mobile device has previously interacted with the one or more access controllers.

2. The method of claim 1, further comprising:
   disconnecting the mobile device application from each of the one or more access controllers where the intent was not detected.

3. The method of claim 1, further comprising:
   maintaining the Bluetooth connection between the mobile device application and each of the access controllers for a selected period of time after authenticating the mobile device application and before detecting the intent.

4. The method of claim 1, wherein the intent is detected when the mobile device application is within a selected range of the specific access controller.

5. The method of claim 1, wherein the one or more access controllers are each operably connected to a turnstile.

6. The method of claim 1, wherein the one or more access controllers are each operably connected to a door.

7. The method of claim 1, wherein the mobile device application connects to a Bluetooth bridge, and
   wherein the Bluetooth bridge performs the:
   authenticating, by each of the one or more access controllers, the mobile device application by validating the credential transferred from the mobile device application over a respective one of the separate Bluetooth connections; and
   detecting, by the one or more access controllers, intent of the mobile device application to engage the specific access controller of the one or more access controllers by determining where the mobile device comprising the mobile device application is heading, wherein the intent of the mobile device application to engage the specific access controller is detected after the mobile device application is authenticated.

8. An access control system comprising:
   one or more access controllers, wherein each of the one or more access controllers transmits a Bluetooth advertisement;
   a mobile device application configured to detect the Bluetooth advertisements from each of the one or more access controllers, determine whether to connect to the Bluetooth advertisements, and connect to each of the one or more access controllers through separate Bluetooth connections,
   wherein the mobile device application is configured to enumerate services of each of the one or more access controllers after connecting to each of the one or more access controllers,
   wherein each of the one or more access controllers authenticates the mobile device application,
   wherein a lock actuator is configured to actuate when an intent of the mobile device application to engage a specific access controller containing the lock actuator is detected,
   wherein the mobile device application connects to each of the one or more access controllers, the mobile device application enumerates services of each of the one or more access controllers, and each of the one or more access controllers authenticates the mobile device application as the mobile device is moving towards the specific access controller and prior to the intent being detected, and
   wherein the intent is shown by the mobile device moving towards the specific access controller or based on past behavior of how the mobile device has previously interacted with the one or more access controllers.

9. The access control system of claim 8, wherein the mobile device application disconnects from each of the one or more access controllers where the intent is not detected after the intent is detected to engage the specific access controller.

10. The access control system of claim 8, wherein the mobile device application maintains the Bluetooth connection between the mobile device application and each of the access controllers for a selected period of time after the mobile device application is authenticated and before the intent is detected.

11. The access control system of claim 8, wherein the intent is detected when the mobile device application is within a selected range of the specific access controller.

12. The access control system of claim 8, wherein the one or more access controllers are each operably connected to a turnstile.

13. The access control system of claim 8, wherein the one or more access controllers are each operably connected to a door.

14. The access control system of claim 8, wherein the mobile device application connects to each of the one or more access controllers through a Bluetooth bridge, the Bluetooth bridge being configured to authenticate the mobile device application for the access controllers and detect the intent of the mobile device application to engage a specific access controller.

15. The access control system of claim 8, wherein the intent of the mobile device application to engage a specific access controller is detected after the mobile device application is authenticated.

16. The access control system of claim 8, wherein the intent of the mobile device application to engage a specific access controller is detected before the mobile device application is authenticated.

17. A method of controlling access through a Bluetooth connection, the method comprising:
    detecting, by an access controller in an access control system, Bluetooth advertisements of one or more mobile device applications in the access control system;
    determining, by the access controller, whether to connect to the Bluetooth advertisements;
    connecting, by access controller, to each of the one or more mobile device applications using separate Bluetooth connections;
    enumerating, by the access controller, services of each of the one or more mobile device applications;
    authenticating, by the access controller, each of the one or more mobile device applications by validating a credential transferred from the one or more mobile device applications over a respective one of the separate Bluetooth connections;
    detecting, by the access control system, intent of a specific mobile device application to engage the access controller by determining where a mobile device of each of the one or more mobile device applications is heading, wherein the intent of the specific mobile device application to engage the specific access controller is detected after each of the one or more mobile device applications are authenticated; and
    activating, by the access controller, a lock actuator within the access controller to unlock a lock of the specific access controller,
    wherein the connecting, enumerating, and authenticating are performed as the mobile device of each of the mobile device applications is moving towards the specific access controller and prior to the intent being detected, and
    wherein the intent is shown by the mobile device moving towards the specific access controller or based on past behavior of how the mobile device has previously interacted with the access controller.

18. The method of claim 17, further comprising:
    disconnecting the access controller from each of the one or more mobile device applications when the intent was not detected to engage the access controller.

* * * * *